United States Patent [19]

Horibata

[11] Patent Number: 4,926,584
[45] Date of Patent: May 22, 1990

[54] APPARATUS FOR HYDROPONIC FARMING

[76] Inventor: Hiroshi Horibata, Mitaka House, No. 25-20 5-Chome, Kamirenjaku, Mitaka-Shi, Tokyo 181, Japan

[21] Appl. No.: 393,095

[22] Filed: Aug. 2, 1989

Related U.S. Application Data

[63] Continuation of Ser. No. 175,105, Mar. 30, 1988, abandoned.

[30] Foreign Application Priority Data

Mar. 31, 1987 [JP] Japan .............................. 62-47982[U]

[51] Int. Cl.$^5$ ............................................. A01G 31/00
[52] U.S. Cl. ............................................. 47/59; 47/61; 47/64
[58] Field of Search ................... 47/59, 60, 61, 62, 63, 47/64, 66, 74, 80, 41.13

[56] References Cited

U.S. PATENT DOCUMENTS

| | | | |
|---|---|---|---|
| 1,775,831 | 9/1930 | Salisbury | 47/66 |
| 2,531,562 | 11/1950 | Eve | 47/80 |
| 2,930,162 | 3/1960 | Mulford | 47/79 |
| 3,927,491 | 12/1975 | Farnsworth | 47/62 |
| 4,292,761 | 10/1981 | Krave | 47/64 |
| 4,382,348 | 5/1983 | Kitsu et al. | 47/59 |
| 4,607,454 | 8/1986 | Koike | 47/63 |

FOREIGN PATENT DOCUMENTS 1543961 11/1979 United Kingdom .................... 47/59

*Primary Examiner*—Robert A. Hafer
*Assistant Examiner*—Charles H. Sam

[57] ABSTRACT

A method for hydroponics comprises submerging the lower region of a bulb and its hair roots for a selected period of time and for another selected period of time, lifting the bulb out of the water to expose to air the lower region of the bulb and an upper portion only for the hair roots of the bulb.

An aquatic float comprises a vessel having a floatable coaster in juxtaposition thereto, means temporarily securing the coaster to the vessel and a seed or bulb bed means disposed at least at one end of the vessel, the seedbed means including a plurality of passages through the walls of the vessel.

23 Claims, 4 Drawing Sheets

FIG.15
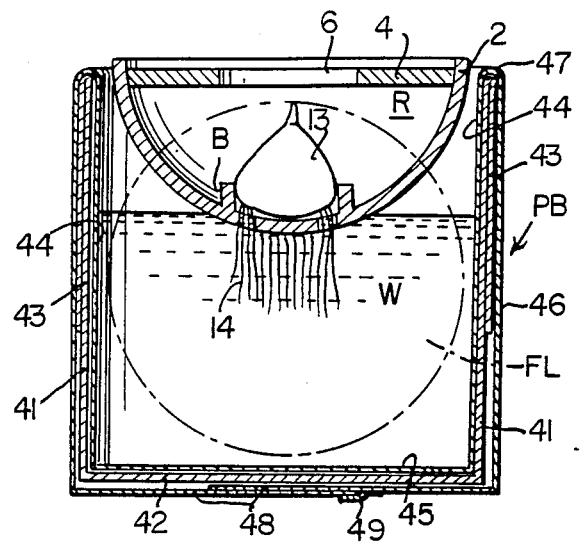
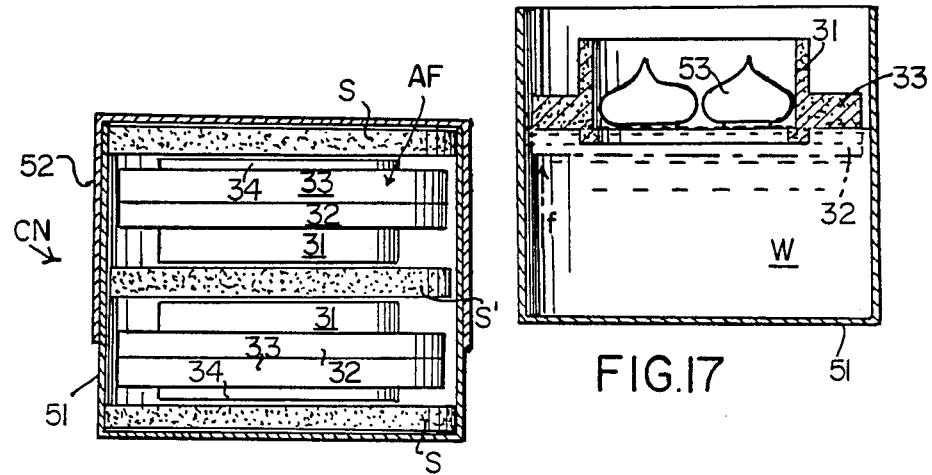
FIG.16
FIG.17

APPARATUS FOR HYDROPONIC FARMING

This application is a continuation, of application Ser. No. 07/175105, filed Mar. 30, 1988 now abandoned.

This invention relates to aquatic floats for hydroponic gardening and in particular to an improved aquatic float method and apparatus for preventing, or retarding, decomposition of seeds and bulbs during the culture thereof by water.

BACKGROUND OF THE PRESENT INVENTION

In the past, the aquatic floats for hydroponics provide seedbed in a configuration of either a mesh or shelf to contact with the water surface on its inner bottom upon sowing. Such prior act has caused putrification of the seed roots and disturbance of carriage of the plants cultivated thereon, the latter being caused by the change of its weight, shape and stature, during the growth.

OBJECTS OF THE PRESENT INVENTION

It is an object of the present invention to provide a novel aquatic float which prevents, or retards, putrification of the plant root and prevents disturbance of the vertical carriage of the plant during its growth.

Another object of the invention is to provide a novel aquatic float to form a novel container for housing seeds prior to its cultivation.

Another object of the invention is to provide a novel aquatic culturing system comprising an aquatic float, a paper box and a plastic film bag.

DESCRIPTION OF THE DRAWINGS

FIG. 15 is a sectional front view of a hemispherical aquatic float for hydroponics in a paper box covered by a plastic film bag, in accordance with the invention;

FIG. 16 is a sectional front view of a can enclosing a pair of cylindrical disk aquatic floats of FIGS. 12 and 13; and FIG. 17 is a sectional front view of a hydroponics system using the can of FIG. 16.

DETAILED DESCRIPTION OF THE PREFERRED EMBODIMENTS

Figure 1:
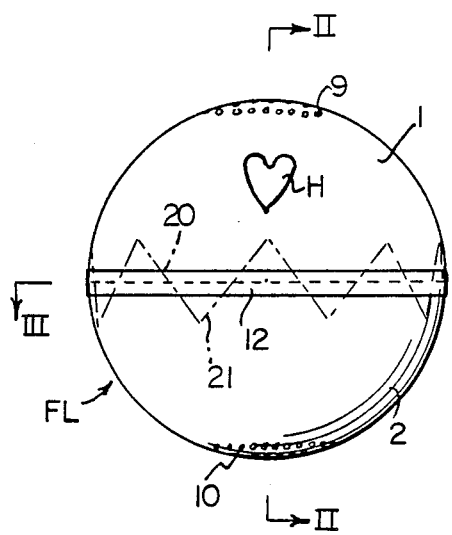
FIG. 1 is a front view of a pair of hemispherical aquatic floats according to the invention.

Referring to the drawings, in FIGS. 1 and 2, a hemispherical aquatic float comprises hemispherical segments 1, 2, each having an apertured floatable platform (hereinafter referred to as "coaster" 3, 4) held together by adhesive tape 12 which is removable positioned at their outer circumferences. The mating surface between segments 1, 2 can be either flat or zig zag 20, 21. The aquatic float segments 1, 2 and the coaster 3, 4 are fabricated of floatable material, such as a form plastic or styrene by a conventional method. Each segment 1, 2 has at its polar end a seedbed b surrounded by a circular barrier B or a circular recess 17 in FIG. 5. The seed bed b in FIG. 3 has a plurality of small holes 10 arranged circularly on the seedbed b for protuding hair roots 14 of a hydroponic bulb 13.

The coasters 3, 4 each has a central aperture 5, 6 and an outer diameter of selective dimensions so that it can be forced and wedged, by finger pressure, into an interior portion of hemispherical segments 1, 2 and held therein by friction to support the weight of bulbs 13. Preferably the seeds or bulbs 13 are wrapped in a plastic film 7 for storage and transport prior to cultivation by water. The aquatic float can be decorated as a gift case with a heat seal H for chocolates and candies therein prior to hydroponic procedures.

Figure 6:
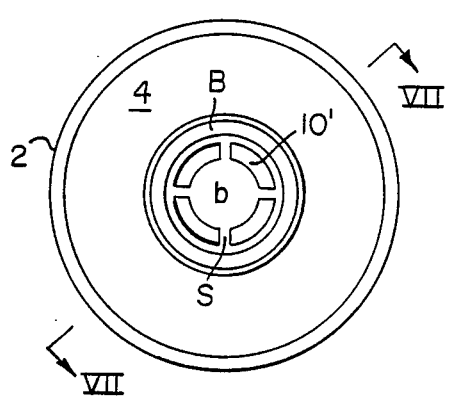
FIG. 6 is a plan view of another hemispherical aquatic float showing an alternate seedbed.
Figure 8:
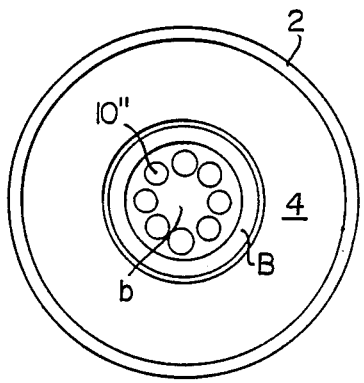
FIG. 8 is a plan view of another hemispherical aquatic float showing another alternate seedbed.

The seedbed b of aquatic float segments 1, 2 can optionally have circular slits 10' or 10" as shown in FIGS. 6 and 8 to provide more opening areas for the roots than the small holes 10 in FIGS. 1 to 4. A ridge B can be moulded in the seedbed area to strengthen the structure in the polar regions of segments 1, 2 and to hold the bulb 13 in a more stable upright position.

Figure 4:
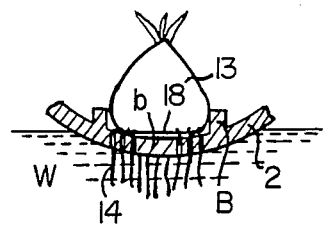
FIGS. 4 and 5 are respectively a partial sectional front view of the hemispherical aquatic float with a coaster for hydroponics shown with a bulb on its seed bed.
Figure 5:
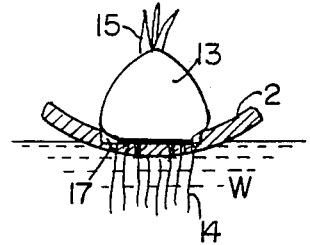

For the hydroponic procedure, the segments 1, 2 are separated into two parts after removing the adhesive tape. The coasters 3, 4 and the film bag 7 are removed. The seeds or bulbs 13 are removed from the film bag 7 and planted in the seed bed areas b, B in a manner so that the roots 14 of the bulbs pass through holes 10 or slits 10' or 10." The coasters 3, 4 are then returned and wedged into their original position as shown in FIG. 2. The segments 1, 2 are then placed upon water as shown in FIGS. 4 and 5 so that the roots 14 and the lower portion of bulb 13 are kept submerged in the water.

If the lower portion of bulb 13, especially the circular germinating section thereof, and the entirety of the roots 14 are submerged for a long period of time, decomposition of both occurs. Accordingly, it is very important to maintain the circular germinating portion, preferably with an upper portion of the roots 14, above the water surface to contact with fresh oxygen in the air for preventing the decomposition of the bulb and the roots.

Figure 2:
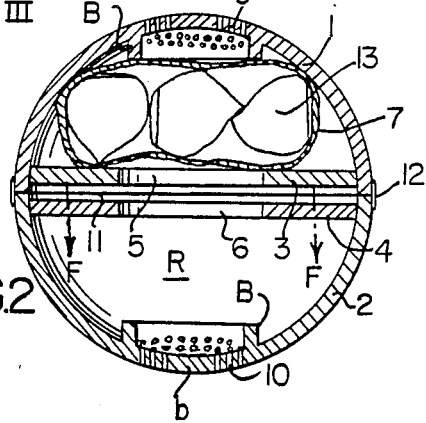
FIG. 2 is a sectional front view of the pair of hemispherical aquatic floats with a coaster through a line II—II of FIG. 1.
Figure 3:
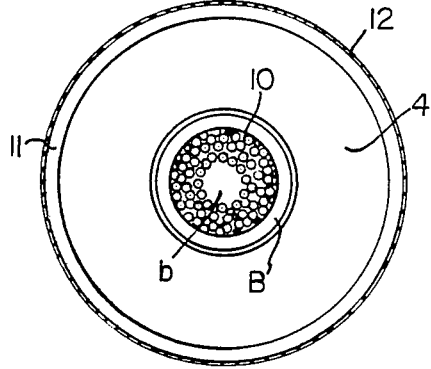
FIG. 3 is a sectional plan view of the pair of hemispherical aquatic floats with a coaster through a line III—III in FIG. 1.
Figure 7:
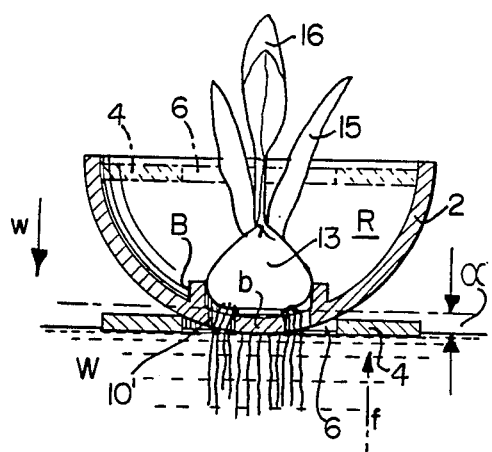
FIG. 7 is a sectional front view of the aquatic float with a coaster through a line VII—VII in FIG. 6, showing a usage of the coaster after a selected growth of the plant.

In accordance with this invention and to prevent decomposition of the growing bulb, at a selected time, the coasters 3, 4 are relocated from their former positions in FIG. 2 to a new position under the segment 2, as shown in FIG. 7 with its aperture 6 aligned with seedbed b, B.

As shown in FIG. 7 and in accordance with this invention, the buoyancy of the coaster 4" will lift the circular germinating section of the bulb and the upper portion of the root hairs out of the water. As shown, the circular germinating portion of roots 14 of the bulb 13 on the seed bed b, B is lifted up a distance of α, due to the buoyancy of the coaster 4 in the direction of arrow so that the circular germinating section of the bulb 13 and the upper portion of the root hairs 14 are constantly exposed to oxygen of the air.

After several days, the bulb 13 begins to germinate as the roots and bulb continually absorb water. In approximately one month, leaves 15 grow to a substantial size and the total weight of the aquatic float progressively increases.

In FIG. 7, the aquatic float sinks down a distance under the water surface in direct proportion to the total changing weight w which depends on the growth of the bulb 13 as a lower portion of the bulb 13 and the root 14 constantly absorbs water. The long leaves 15 and flowers 16 after growth of the bulb 13 disturb the balance of the aquatic float on the water W due to its unsymmetrical blooming and spreading which displaces the weight of the plant from its vertical center line. Such changing unbalance of the growing plant would unsatisfactorily tilt the aquatic float if it were not for the stabilizing effect of the wide coaster 3, 4 relative to the concave small diameter of the segment 1, 2 and seedbed b, B.

Figure 9:
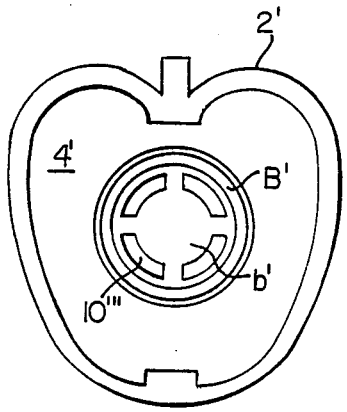
FIG. 9 is a plan view of an aquatic float with a coaster for hydroponics in the form of a half of apple or heart.
Figure 10:
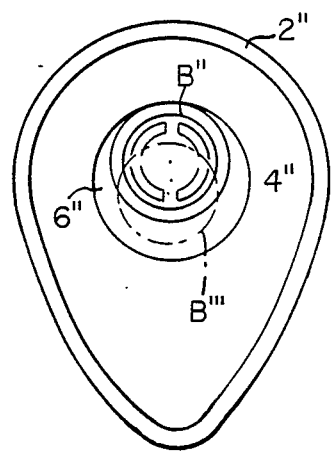
FIG. 10 is a plan view of an aquatic float with a coaster for hydroponics in the form of a half of egg.

FIGS. 9 and 10 disclose modifications of the aquatic float in the form of an apple, heart or egg.

Figure 11:
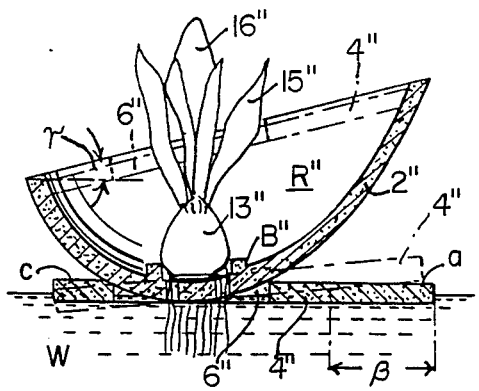
FIG. 11 is a sectional side view of an aquatic float with a coaster if FIG. 10, and showing a usage of the coaster after a selected growth of the plant.

In FIG. 11, the segment 2" is one half of an egg shaped hemisphere which has an off-center seed bed B". Coaster 4" has an off-center aperture 6" to match and mate with the seedbed B". The curved walls of segment 2" are selectively formed so that it will float at α degrees to the water surface upon planting of the bulb 13" and before the coaster 4" is placed under the seedbed 6". At a selected later time in the plant growth when the coaster 4" is placed under the seed bed 6", the angle α can be controlled by changing, as by cutting with hand scissors, the outline of coaster 4" to be more or less elliptical. Thus the aquatic float can be selectively tilted towards the source of sunlight as it freely rotates on the water.

Figure 12:
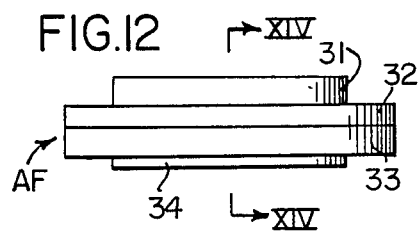
FIGS. 12 and 13 are respectively a front and plan view of a cylindrical disk aquatic float with a coaster for hydroponics.
Figure 13:
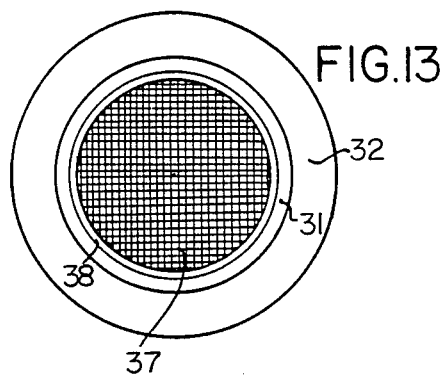
Figure 14:
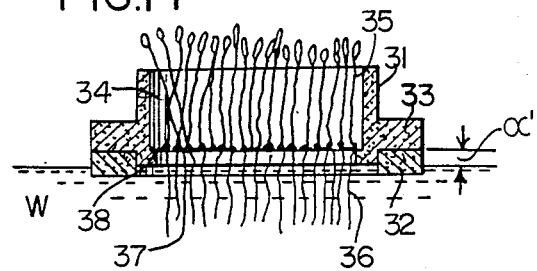
FIG. 14 is a sectional side view through a line XIV—XIV of FIG. 12.

In FIGS. 12 to 14, the float AF comprises an aquatic disk 34 having a cylindrical wall 31 with brim 33 and a seedbed mesh 37 supported on an inside shelf 38 of wall 31. The seed mesh 37 should be located so that it is at the level of the water surface when the aquatic float AF is launched on the water.

for cultivation of vegetables 35 such as alfalfa on the household table, the seeds are firstly sown on the seed mesh 37 for their germination under water. The seed mesh 37 and the growing vegetable seeds progressively sink under the water surface because of their weight which increases gradually.

The coaster 32 on brim 33, at a selected time, is transferred under 32 to lift the aquatic float AF for a distance of α' as shown in FIG. 14 so as to expose in the air the upper portion of roots 36 under the seed mesh 37 so that the roots will not decompose. Thus, the aquatic float AF enables fresh vegetables 35 to be provided on the household table every morning.

The hemispherical or cylindrical disk aquatic floats with the coasters described hereinbefore, advantageously are packaged by mating the two segments, secured with tape and placed in a paper box or can PB or CN, as shown in FIGS. 15 and 16. Such PB, CN can be selectively designed and decorated when it is intended to be used also for the hydroponics procedure. The combined spherical aquatic float FL may optionally enclose gift products 13 such as bulbs, chocolates, candies, etc., which are placed into a film bag 7. After such spherical aquatic float FL is used as a gift product case and the contents thereof are taken out to eat, each hemispherical aquatic float 1, 2 is used to plant a bulb 13 into its seedbed B and floated on the water W in a suitable vessel. The vessel for hydroponics of the present invention, may use any containers such as a cup, a bowl, a pot, a tub, etc. However, it is preferably to use the paper box PB covered with the plastic film bag in which the spherical aquatic float FL is wrapped.

In preparation of the aquatic paper vessel of FIG. 15, the plastic film bag described hereinbefore is firstly positioned inside of the paper box PB along its bottom and vertical sides. Thereafter the remaining plastic film 43 as shown at 44, 45 is bent down along the outside of the box an turned over bottom surfaces 41, 42 of the paper box PB as shown at 46, 48. The ends of the plastic film are secured with an adhesive tape on their end portions 48.

The hemispherical aquatic float 2 with the planted bulb 13 is floated in the aquatic paper vessel PB after the coaster 4 is inserted into its upper portion as shown in FIG. 15. The bulb 13 germinates with its roots in the water W and grows in the cavities R covered with the coaster 4.

The lower portion of the bulb 13 progressively submerges due to the increase of its weight because of its growth. At a selected time the coaster 4 is transferred under the aquatic float 2 to lift it up until its blooming period is completed.

In FIG. 16, two cylindrical disk aquatic floats AF of FIG. 12, are positioned in opposite relationship with packing material S, S' therebetween in a can CN comprising a body 51 and a cover 52 for providing a vessel for hydroponics, as shown in FIG. 17. The aquatic float AF, in FIG. 17 accommodates two bulbs 53 on the seed mesh for cultivation in the body 51 of the can CN. The bulbs 53 grow progressively in the water W and bulbs 53 on the seed mesh progressively submerges into the water. At a selected time the coaster on brim 33 is transferred under the later to lift up the seed mesh until complete blooming, as described hereinbefore.

The present inventions have been described and pointed out the fundamental novel futures as applied to preferred embodiment thereabove, however, it will be understood that various omissions and substitutions and changes in the form and details of the aquatic float illustrated may be made by the skilled in the art without departing from the spirit of the invention.

It is the invention therefore to be limited only as indicated by the scope of the following claims.

I claim:

1. An aquatic float for hydrophonic gardening comprising:
   a floatable curved surface vessel means having a cavity formed within the vessel for enclosing a bulb to be grown therein, the vessel cavity having an exterior and an interior wall;
   a floatable coaster means having a substantially planar extent and extending across the cavity for partially closing the cavity, the coaster means having an aperture therein in alignment with seedbed means which is spaced from the coaster means;

the seedbed means being located on the interior wall of the vessel for supporting the bulb disposed in the cavity of the vessel, the seedbed means having a plurality of passage means in a defined arrangement extending through the interior and exterior walls of the vessel for receiving growing hair roots of the bulb;

wherein the aperture of the coaster means has a shape and size substantially corresponding to the defined arrangement of the passage means and is in alignment therewith.

2. An aquatic float according to claim 1 wherein the vessel means is hollow and hemispherical in cross-section and wherein coaster means securing means temporarily secures the coaster to the interior wall of the vessel means.

3. An aquatic float according to claim 1 further comprising a barrier means surrounding the seedbed means for substantially vertically supporting the bulb disposed therein.

4. An aquatic float according to claim 1 wherein the vessel means comprises a pair of hollow and hemispherical segments removably joined at the approximate equatorial plane of the segments.

5. An aquatic float according to claim 1 wherein the vessel means is hollow and hemispherical in cross-section and the coaster means is removably secured to the vessel adjacent the approximate equatorial plane of the vessel means.

6. An aquatic float according to claim 1 wherein the passage means are a plurality of circularly arranged arcuate slits.

7. An aquatic float according to claim 1 wherein the passage means are a plurality of holes.

8. An aquatic float for hydrophonic gardening comprising:

a floatable curved surface vessel means having a cavity formed within the vessel for enclosing a bulb to be grown therein, the vessel cavity having an exterior and an interior wall;

a floatable coaster means having a substantially planar extent, the coaster means having an aperture therein in juxtaposed abutting and aligned relationship with seedbed means and the exterior wall of the vessel;

the seedbed means supporting the bulb disposed in the cavity of the vessel, the seedbed means having a plurality of passage means in a defined arrangement extending through the interior and exterior walls of the vessel for receiving growing hair roots of the bulb;

wherein the aperture of the coaster means has a shape and size substantially corresponding to the defined arrangement of the passage means and is in alignment therewith.

9. An aquatic float according to claim 8 further comprising barrier means surrounding the seedbed means for substantially vertically supporting the bulb disposed therein.

10. An aquatic float according to claim 8 wherein the passage means are a plurality of circularly arranged arcuate slits.

11. An aquatic float according to claim 8 wherein the passage means are a plurality of holes.

12. An aquatic float according to claim 1 wherein the vessel means is hollow and has a hemispherical cross section in the shape of an apple.

13. An aquatic float according to claim 8 wherein the vessel means is hollow and has a hemispherical cross section in the shape of an apple.

14. An aquatic float according to claim 1 wherein the vessel means is hollow and has a substantially elliptical cross section.

15. An aquatic float according to claim 8 wherein the vessel means is hollow and has a substantially elliptical cross section.

16. An aquatic float according to claim 14 wherein the seedbed means is located near the polar region of the vessel having the largest diameter.

17. An aquatic float according to claim 15 wherein the seedbed means is located near the polar region of the vessel having the largest diameter.

18. An aquatic float according to claim 4 wherein the vessel means is disposed in a container means.

19. An aquatic float according to claim 1 wherein the vessel means is disposed in a container means.

20. An aquatic float according to claim 8 wherein the vessel means is disposed in a container means.

21. An aquatic float according to claim 18 wherein the container means includes a substantially water impervious means.

22. An aquatic float according to claim 19 wherein the container means includes a substantially water impervious means.

23. An aquatic float according to claim 20 wherein the container means incudes a substantially water impervious means.

* * * * *